US012589882B2

(12) United States Patent
Evans et al.

(10) Patent No.: US 12,589,882 B2
(45) Date of Patent: *Mar. 31, 2026

(54) SHARED CRYOGENIC BOTTOMING CYCLE

(71) Applicant: RTX CORPORATION, Farmington, CT (US)

(72) Inventors: Brandon M. Evans, San Antonio, TX (US); Neil J. Terwilliger, Cheshire, CT (US); Melissa Coombes, Orono, ME (US)

(73) Assignee: RTX CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/770,884

(22) Filed: Jul. 12, 2024

(65) Prior Publication Data

US 2024/0359813 A1 Oct. 31, 2024

Related U.S. Application Data

(63) Continuation-in-part of application No. 17/871,270, filed on Jul. 22, 2022.

(51) Int. Cl.
| | |
|---|---|
| *B64D 37/30* | (2006.01) |
| *B64D 37/34* | (2006.01) |
| *F02C 6/00* | (2006.01) |
| *F02C 7/22* | (2006.01) |

(52) U.S. Cl.
CPC ............. *B64D 37/30* (2013.01); *B64D 37/34* (2013.01); *F02C 6/00* (2013.01); *F02C 7/22* (2013.01)

(58) Field of Classification Search
CPC .......... F01K 23/10; F01K 23/08; F02C 7/224; F02C 7/141; F02C 7/32; F02C 6/18; F05D 2260/10; F05D 2260/213; F05D 2260/232
See application file for complete search history.

(56) References Cited

U.S. PATENT DOCUMENTS

| | | | |
|---|---|---|---|
| 6,608,395 B1* | 8/2003 | Steinway | ................ F01D 15/10 |
| | | | 290/40 C |
| 11,187,150 B2 | 11/2021 | Razak et al. | |
| 11,939,913 B2 | 3/2024 | Terwilliger et al. | |
| 11,970,970 B2 | 4/2024 | Macdonald et al. | |
| 2007/0163261 A1* | 7/2007 | Strathman | ................. F03G 6/00 |
| | | | 60/659 |
| 2011/0265445 A1* | 11/2011 | Botero | ..................... F23J 15/06 |
| | | | 60/39.182 |
| 2013/0318965 A1* | 12/2013 | Ekanayake | ............. F02C 1/007 |
| | | | 60/273 |

(Continued)

OTHER PUBLICATIONS

Extended European Search Report for European Application No. 25189458.0 mailed Dec. 5, 2025.

*Primary Examiner* — Devon C Kramer
*Assistant Examiner* — Henry Ng
(74) *Attorney, Agent, or Firm* — Carlson, Gaskey & Olds, P.C.

(57) ABSTRACT

An aircraft propulsion system includes at least two gas turbine engines and a bottoming cycle system where a working fluid is circulated within a closed circuit that includes a bottoming compressor section and a bottoming turbine section. Each of the at least two gas turbine engines include a primary heat exchanger for communicating thermal energy into the working fluid of the bottoming cycle.

19 Claims, 5 Drawing Sheets

(56) References Cited

U.S. PATENT DOCUMENTS

| | | | |
|---|---|---|---|
| 2015/0096300 A1* | 4/2015 | Gurin | F01K 23/04 |
| | | | 60/668 |
| 2015/0240719 A1* | 8/2015 | Kraft | F02C 6/16 |
| | | | 290/52 |
| 2022/0298967 A1 | 9/2022 | Balandier et al. | |
| 2023/0212983 A1* | 7/2023 | Sibilli | F02C 7/14 |
| | | | 60/730 |
| 2023/0313737 A1 | 10/2023 | MacDonald et al. | |
| 2024/0011417 A1* | 1/2024 | Sibbach | F01D 21/12 |
| 2024/0026824 A1 | 1/2024 | Terwilliger et al. | |

* cited by examiner

WASTE HEAT

HYDROGEN

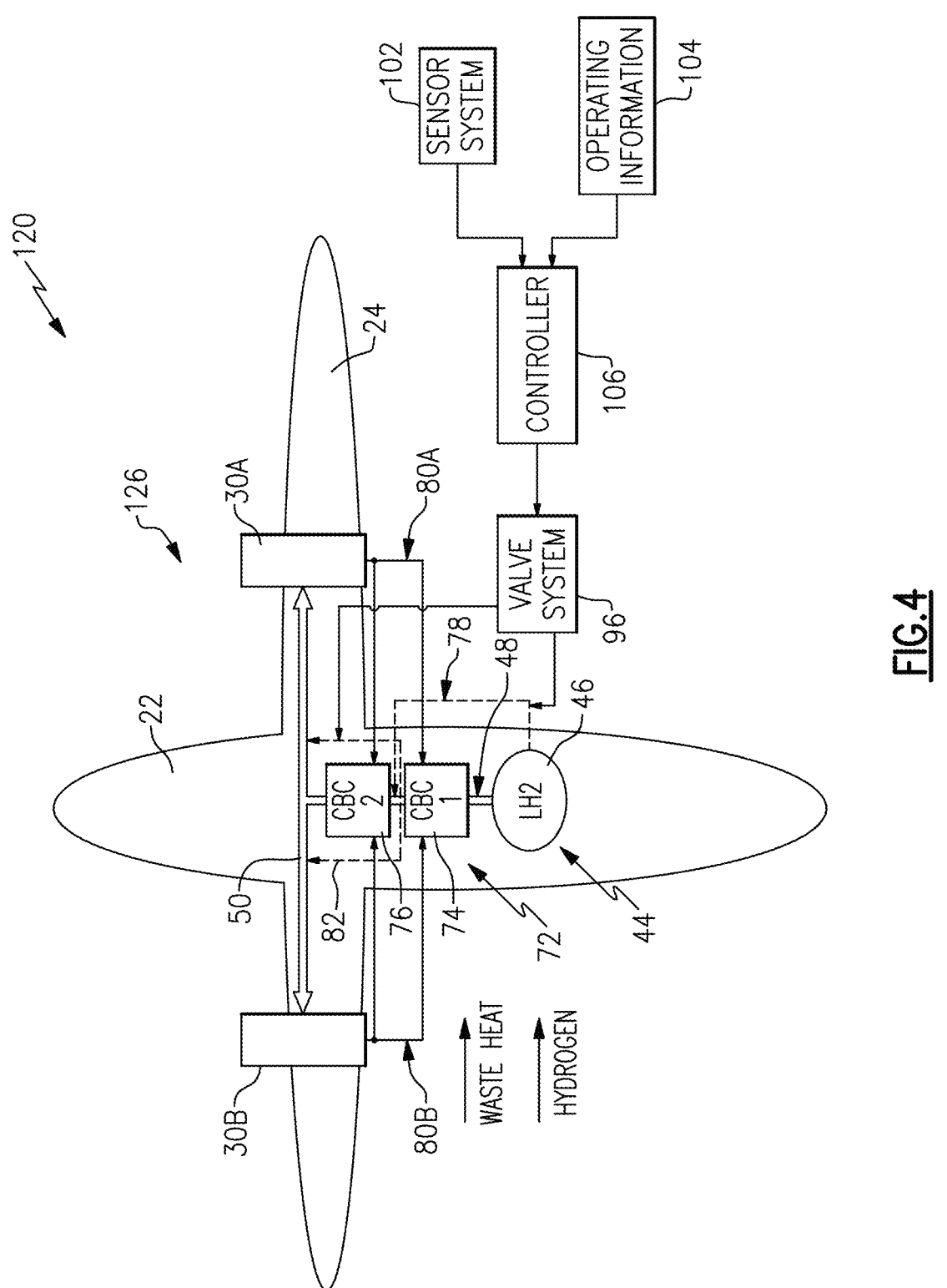
_FIG.4_

SHARED CRYOGENIC BOTTOMING CYCLE

CROSS REFERENCE TO RELATED APPLICATION

This application is a continuation-in-part of U.S. application Ser. No. 17/871,270 filed on Jul. 22, 2022. The disclosures of U.S. application Ser. No. 17/871,270 are incorporated by reference in its entirety in this application.

TECHNICAL FIELD

The present disclosure relates generally to a bottom cycle for an aircraft propulsion system and more specifically to a shared bottoming cycle that utilizes a cryogenic fuel as a heat sink.

BACKGROUND OF THE INVENTION

Gas turbine engines typically include a compressor where inlet air is compressed and delivered into a combustor. In the combustor, the compressed air is mixed with fuel and ignited to generate an exhaust gas flow. The exhaust flow is expanded through a turbine section to generate shaft power used to drive the compressor and a propulsive fan. Some energy in the high energy exhaust flow is recovered as it is expanded through a turbine section. However, a large amount of energy in the form of heat is simply exhausted from the turbine section to the atmosphere. A bottoming cycle utilizes recovered heat to generate additional useful work. A working fluid in the bottoming cycle is heated to drive a secondary turbine to generate additional shaft power. The working fluid in the bottoming cycle is then cooled, compressed, and reheated before expansion back through the turbine. The capability of the working fluid to accept heat limits energy recovery of the bottoming cycle.

SUMMARY OF THE INVENTION

An aircraft propulsion system according to an exemplary embodiment of this disclosure, among other possible things includes at least two gas turbine engines that each include a compressor that pressurizes an inlet flow that is mixed with a cryogenic fuel and ignited in a combustor to generate an exhaust gas flow that is expanded through a turbine to generate shaft power and a propulsive fan driven by the turbine, a bottoming cycle system where a working fluid is circulated within a closed circuit that includes a bottoming compressor section and a bottoming turbine section, the working fluid is compressed in the bottoming compressor section and expanded through the bottoming turbine section to generate shaft power, each of the at least two gas turbine engines includes a primary heat exchanger for communicating thermal energy into the working fluid of the bottoming cycle system, and a fuel system that includes a cryogenic fuel storage tank and a fuel flow path for routing the cryogenic fuel to each of the at least two gas turbine engines, a fuel/working fluid heat exchanger provides thermal communication between the cryogenic fuel and the working fluid to cool the working fluid flow from the bottoming turbine to the bottoming compressor.

In a further embodiment of the foregoing aircraft propulsion system, the closed circuit for working fluid of the bottoming cycle includes separate portions for communicating working fluid to the primary heat exchanger of each of the at least two gas turbine engines.

In a further embodiment of any of the foregoing, the aircraft propulsion system further includes a thermal transfer circuit for communicating thermal energy from each of the at least two gas turbine engines into the working fluid of the bottoming cycle.

In a further embodiment of any of the foregoing aircraft propulsion systems, the bottoming cycle system is disposed within a fuselage of an aircraft.

In a further embodiment of any of the foregoing aircraft propulsion systems, the bottoming cycle system includes at least two bottoming cycles that each include a separate closed circuit for separate flows of working fluid and a separate fuel/working fluid heat exchanger where the cryogenic fuel is placed in thermal communication with a corresponding one of the separate flows of working fluid of each of the at least two bottoming cycles.

In a further embodiment of any of the foregoing aircraft propulsion systems, thermal energy from each of the at least two gas turbine engines is communicated separately to each of the at least two bottoming cycles.

In a further embodiment of any of the foregoing aircraft propulsion systems, the cryogenic fuel is separately heated by each of the at least two bottoming cycles.

In a further embodiment of any of the foregoing, the aircraft propulsion system further includes a valve system for controlling cryogenic fuel flow to each of the at least two bottoming cycles. The valve system is configured to bypass fuel flow separately around each of the at least two bottoming cycles such that cryogenic fuel is heated by less than all of the at least two bottoming cycles.

In a further embodiment of any of the foregoing, the aircraft propulsion system includes a controller that is programed to operate the valve system to route cryogenic fuel around one of the at least two bottoming cycles in response to a predefined operating condition.

In a further embodiment of any of the foregoing aircraft propulsion systems, the flow of cryogenic fuel proceeds in series through the at least two bottoming cycles.

In a further embodiment of any of the foregoing aircraft propulsion systems, one of the at least two bottoming cycles includes a different maximum capacity for transferring thermal energy than others of the at least two bottoming cycles.

An aircraft propulsion system according to another exemplary embodiment of this disclosure, among other possible things includes at least two gas turbine engines that each include a compressor that pressurizes an inlet flow that is mixed with a cryogenic fuel and ignited in a combustor to generate an exhaust gas flow that is expanded through a turbine to generate shaft power and a propulsive fan driven by the turbine, a bottoming cycle system that includes at least two bottoming cycles that each includes a working fluid circulated within a closed circuit that includes a bottoming compressor section and a bottoming turbine section, the working fluid is compressed in the bottoming compressor section and expanded through the bottoming turbine section to generate shaft power, each of the at least two gas turbine engines includes a primary heat exchanger for communicating thermal energy into the working fluid of the bottoming cycle, a fuel system that includes a cryogenic fuel storage tank and a fuel flow path for routing the cryogenic fuel to the combustor of each of the at least two gas turbine engines through each of the at least two bottoming cycles in series, each of the at least two bottoming cycles includes a fuel/working fluid heat exchanger that provides thermal communication between the cryogenic fuel and the working fluid within the corresponding one of the at least two bottoming cycles.

In a further embodiment of the foregoing aircraft propulsion system, thermal energy from each of the at least two gas turbine engines is communicated separately to each of the at least two bottoming cycles.

In a further embodiment of any of the foregoing, the aircraft propulsion system further includes a valve system for controlling cryogenic fuel flow to each of the at least two bottoming cycles. The valve system is configured to bypass fuel flow separately around each of the at least two bottoming cycles such that cryogenic fuel is heated by less than all of the at least two bottoming cycles.

In a further embodiment of any of the foregoing, the aircraft propulsion system includes a controller that is programed to operate the valve system to route cryogenic fuel around one of the at least two bottoming cycles in response to a predefined operating condition.

In a further embodiment of any of the foregoing aircraft propulsion systems, one of the at least two bottoming cycles includes a different maximum capacity for transferring thermal energy than others of the at least two bottoming cycles.

In a further embodiment of any of the foregoing, the aircraft propulsion system further includes a thermal transfer circuit for communicating thermal energy from each of the at least two gas turbine engines into the working fluid of the bottoming cycle.

A method of configuring an aircraft propulsion system according to another exemplary embodiment of this disclosure, among other possible things includes configuring at least two gas turbine engines to generate an exhaust gas flow, configuring a bottoming cycle system that includes at least two bottoming cycles that each include a working fluid circulated within a closed circuit that includes a bottoming compressor section and a bottoming turbine section, each of the at least two gas turbine engines includes a primary heat exchanger for communicating thermal energy into the working fluid of the bottoming cycle, and configuring a cryogenic fuel system that includes a cryogenic fuel storage tank and a fuel flow path for routing the cryogenic fuel to the combustor of each of the at least two gas turbine engines through each of the at least two bottoming cycles in series, each of the at least two bottoming cycles includes a fuel/working fluid heat exchanger that provides thermal communication between the cryogenic fuel and the working fluid within the corresponding one of the at least two bottoming cycles.

In a further embodiment of the foregoing, the method further includes configuring a valve system for controlling a flow of the cryogenic fuel through a bypass passage around one of the at least two bottoming cycles.

In a further embodiment of any of the foregoing, the method further includes assembling the bottoming cycle system such that at least one of the at least two bottoming cycles includes a different maximum capacity for transferring thermal energy than others of the at least two bottoming cycles.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 4 is a schematic view of another example aircraft propulsion system including multiple bottom cycles shared with multiple turbine engines.

DETAILED DESCRIPTION

U.S. application Ser. No. 17/871,270 is incorporated herein, by reference in its entirety.

Figure 1:
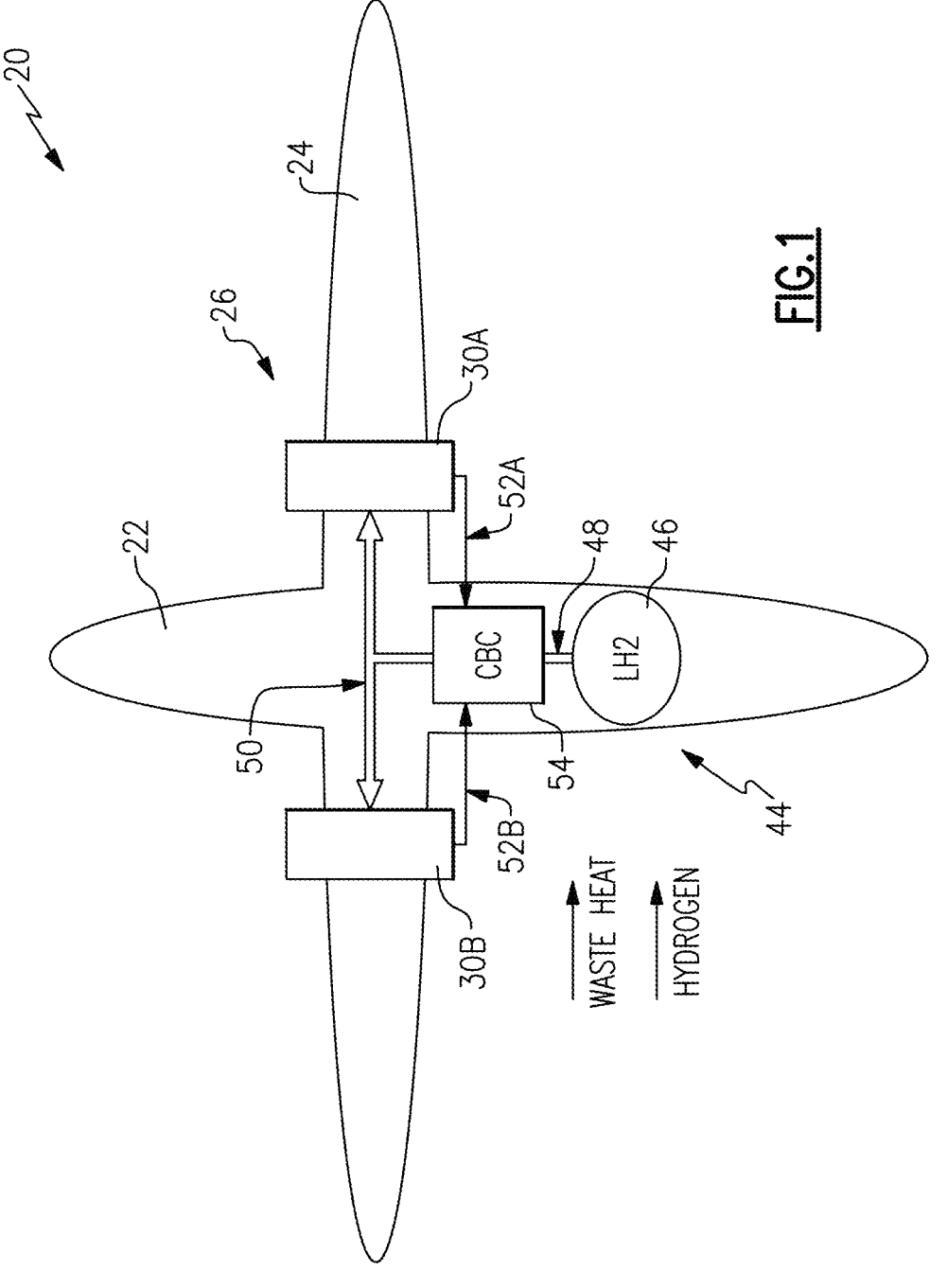
FIG. 1 is a schematic view of an example aircraft propulsion system including a shared bottoming cycle.

FIG. 1 schematically illustrates an aircraft 20 and aircraft propulsion system 26 that includes a bottoming cycle 54 that is shared between two gas turbine engines 30A-B. The example bottoming cycle 54 receives thermal energy separately from each of the gas turbine engines 30A-B for heating a working fluid flow circulated within a closed circuit. A cryogenic fuel provides a heat sink for the working fluid flow prior to being transformed into a gas and communicated to a combustor of each of the gas turbine engines 30A-B.

The turbine engines 30A-B are supported on wings 24 of the aircraft 24. The example bottoming cycle 54 and a cryogenic fuel system 44 are supported within the aircraft fuselage 22. The cryogenic fuel system 44 provides a liquid fuel flow 48 that is communicated through the bottoming cycle 54 to accept thermal energy and cool a working fluid flow that circulates within the bottoming cycle 54. Thermal energy schematically indicated by arrows 52A, 52B from respective ones of the turbine engines 30A-B is recovered in the bottoming cycle 54. The shared bottoming cycle 54 provides a lighter overall propulsion system 26 while also providing an improved mounting position within the fuselage 22 (e.g., improved access to the location in the fuselage 22 for installation, maintenance, etc.).

Figure 2:
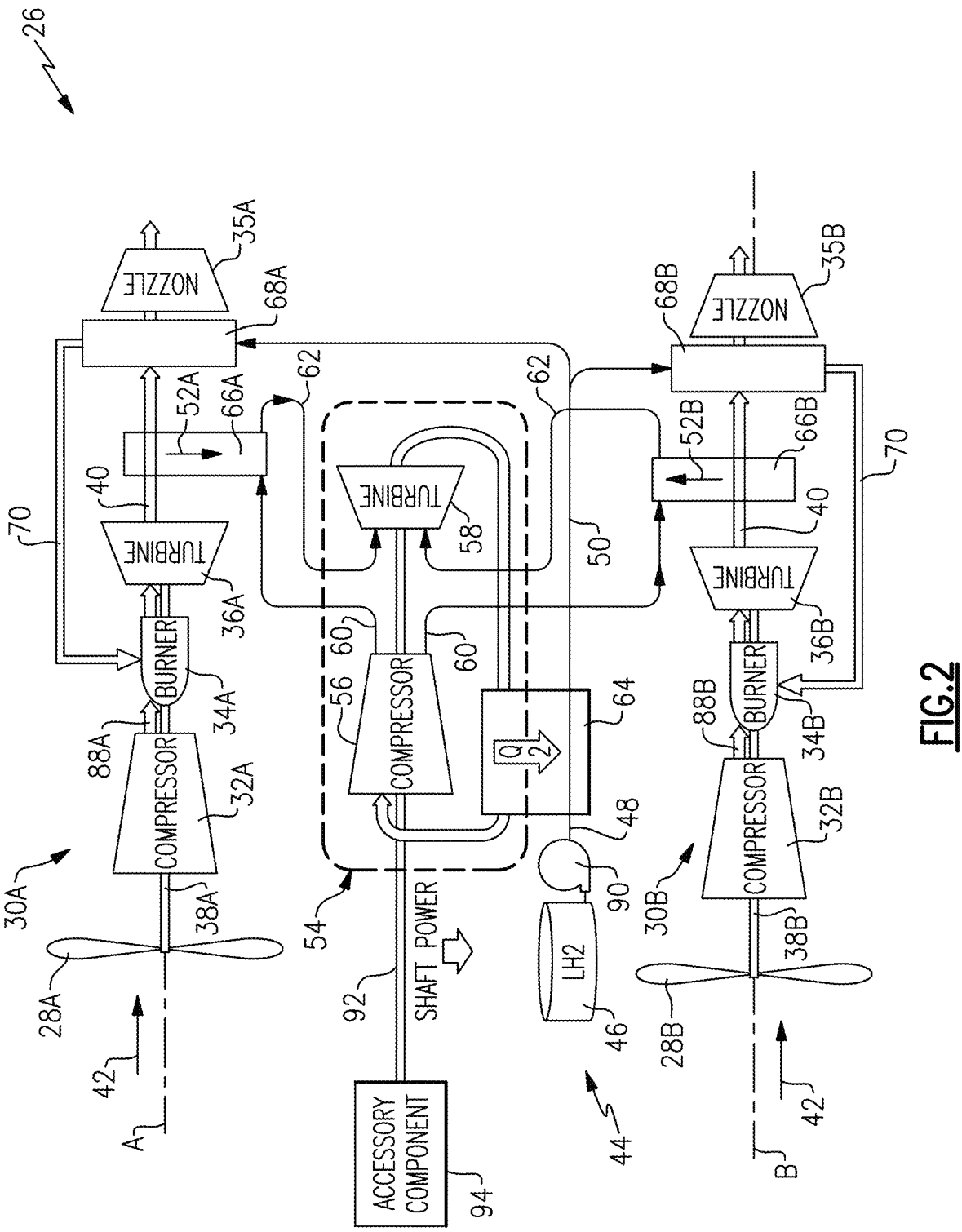
FIG. 2 is a detailed schematic view of the example aircraft propulsion system shown in FIG. 1.

Referring to FIG. 2, with continued reference to FIG. 1, each of the gas turbine engines 30A-B include a corresponding compressor section 32A-B, a combustor section 34A-B and a turbine section 36A-B disposed along a respective longitudinal axis A, B. A corresponding fan 28A-B drives inlet airflow 42 into the compressor sections 32A-B. The inlet flow 42 is compressed and communicated as a pressurized core flow 88A-B to the corresponding combustor section 34A-B, where it is mixed with a gaseous cryogenic fuel flow 70 and ignited to generate an exhaust gas flow 40. The exhaust gas flow 40 expands through the corresponding turbine section 36A-B where energy is extracted and utilized to generate shaft power to drive a corresponding engine shaft 38A-B. The engine shafts 38A-B drive the corresponding compressor section 32A-B and fans 28A-B. The exhaust gas flow 40 is subsequently exhausted through an exhaust nozzle 35A-B.

Although an example engine architecture is disclosed by way of example, other turbine engine architectures are within the contemplation and scope of this disclosure. Moreover, although the disclosed non-limiting embodiment depicts a turbofan turbine engine, it should be understood that the concepts described herein are not limited to use with turbofans as the teachings may be applied to other types of turbine engines. Additionally, the features of this disclosure may be applied to other engine configurations utilized to generate shaft power.

The cryogenic fuel system 44 includes at least a fuel tank 46 and a fuel pump 90 to generate a liquid fuel flow 48 through fuel passages to each of the combustors 34A-B. The example fuel system 44 is configured to provide a hydrogen based fuel, such as a liquid hydrogen (LH$_2$). Although hydrogen is disclosed by way of example, other cryogenic, non-carbon based fuels could be utilized and are within the contemplation of this disclosure.

The fuel tank 46 includes features for storing a cryogenic fuel at temperatures required to maintain the fuel in a liquid phase. Temperatures required to maintain the cryogenic fuel in a liquid phase may be as low as about −412° F. In one example embodiment, the cryogenic fuel is maintained at a temperature below 0° F. In another example embodiment, the fuel is maintained in the tank 46 at temperatures below −100° F. The cryogenic fuel may be maintained at temperatures below about −150° F. and as low as about −435° F.

The low temperatures of the cryogenic fuel provides a source of heat absorption that is utilized in a bottoming cycle 54. The bottoming cycle 54 provides for recovering thermal energy otherwise lost as exhaust through the nozzle 32.

The example bottoming cycle 54 includes a bottoming compressor 56 that compresses a working fluid flow that is expanded through a bottoming turbine 58 to rotate an output shaft 92 to drive an accessory component 94. In one example embodiment, the accessory component 94 is a generator that produces electric power for use by the aircraft 20 and/or propulsion system 26. In one example embodiment, the output shaft 92 is coupled to the bottoming compressor 56 such that the bottoming turbine 58 drives the bottoming compressor 56.

A working fluid flow circulating within the bottoming cycle 54 is heated with thermal energy 52A-B from each of the gas turbine engines 30A-B. In one example embodiment, a working fluid flow, schematically shown as arrows 60 is communicated through a primary heat exchanger 66A-B of each of the corresponding gas turbine engines 30A-B. The primary heat exchanger 66A-B is in thermal communication with the exhaust gas flow 40 generated by each of the gas turbine engines.

Heated and expanded working fluid flow exhausted from the bottoming turbine 58 is cooled by the cryogenic fuel flow 48 in a fuel/working fluid heat exchanger 64. The cryogenic fuel flow 48 is extremely cold and has a large capacity to accept heat from the working fluid flow. Moreover, heat from the working fluid flow provides for initial heating of the cryogenic fuel flow 48.

The cryogenic fuel flow 48 is transformed into a vaporized fuel flow 70 prior to introduction within a corresponding combustor section 34A-B. Accordingly, any heat that is accepted from the working fluid flow provides a preheated fuel flow indicated at 50 that is directed to an exhaust heat exchanger 68A-B of each corresponding engine 30A-B.

Sharing of the bottoming cycle 54 between each of the two gas turbine engines 30A-B provides for a lighter, more efficient propulsion system to be utilized aboard an aircraft. Moreover, the use of a single bottoming cycle 54 enables central placement of the bottoming cycle 54 near the fuel system 44 within the aircraft fuselage 22. Moreover, the location within the fuselage 22 also corresponds with an advantageous location of the cryogenic fuel tank 46 for the cryogenic fuel system 44.

Figure 3:
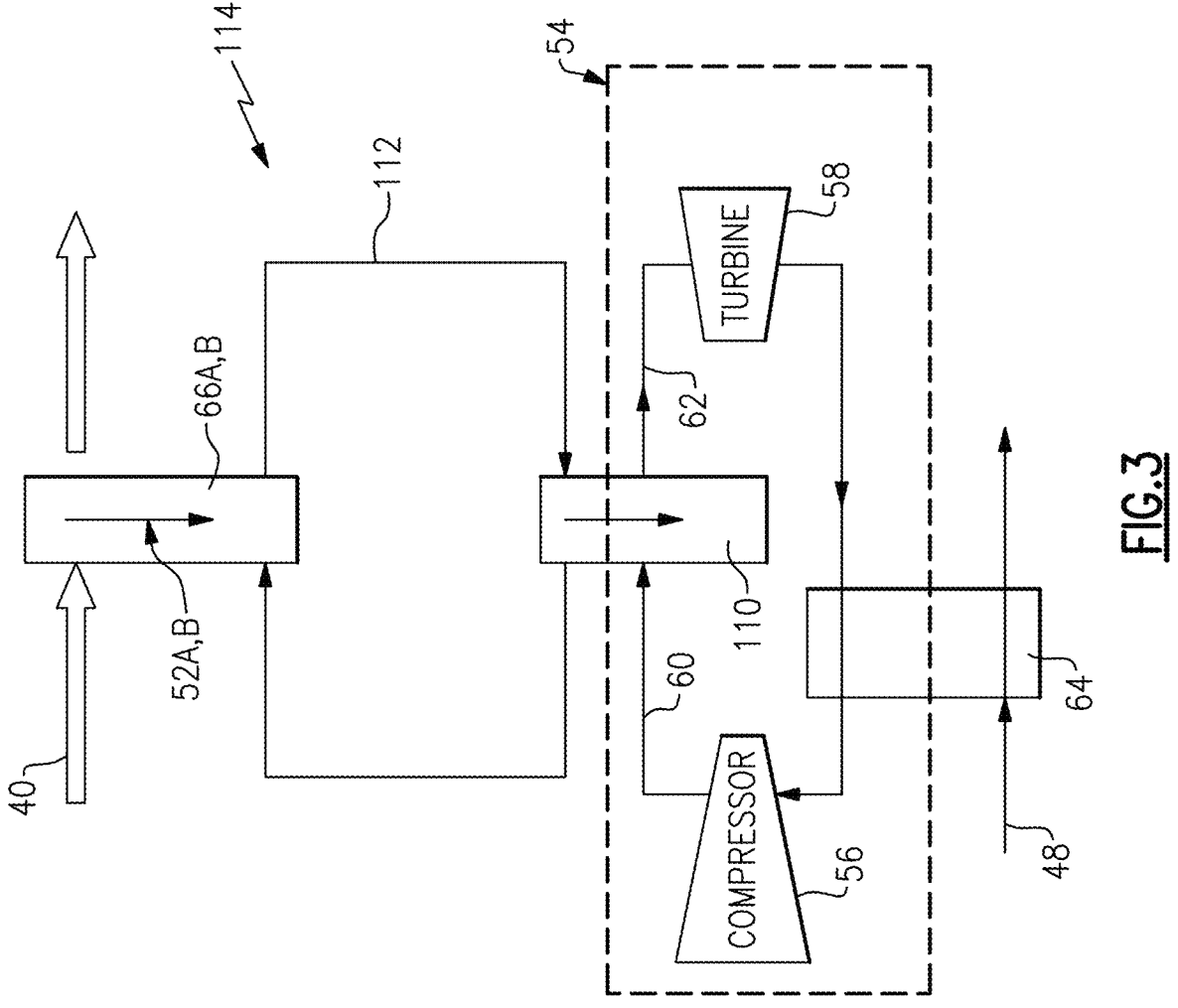
FIG. 3 is a schematic view of a thermal transfer circuit of the example aircraft propulsion system.

Referring to FIG. 3, an example thermal transfer circuit 114 is schematically shown and is routed between the primary heat exchangers 66A-B of each of the engines 30A-B and the bottoming cycle system 54. Thermal energy transferred into the thermal transfer circuit 114 is carried by a thermal bus fluid 112 to a working fluid heat exchanger 110 of the bottoming cycle system 54. In the working fluid heat exchanger 110, thermal energy is transferred from the thermal bus fluid 112 into the cool working fluid flow 60 to generate a heated working fluid flow 62. The heated working fluid flow 62 is expanded through the bottoming turbine 58 and subsequently cooled by the fuel flow 48 in the fuel/working fluid heat exchanger 64. The thermal transfer circuit 114 provides for the use of a thermal bus fluid 112 that is optimized to carry and transfer thermal energy and for the use of a working fluid that is optimized for generating energy from the recovered thermal energy. The example thermal transfer circuit 112 is shown schematically and may include conduits, valving, pumps, and other fluid transfer can control devices utilized to generate and control the flow of the thermal bus fluid 112.

Referring to FIG. 4, another example aircraft 120 includes example propulsion system 126 that includes first and second gas turbine engines 30A-B along with a bottoming cycle system 72 that includes a first bottoming cycle 74 and a separate second bottoming cycle 76. The first and second bottoming cycles 74 and 76 are separately operable and include their own working fluids circulating within a separate closed circuit. Each of the first bottoming cycle 74 and the second bottoming cycle 76 are capable of receiving thermal energy 80A-B from each of the turbine engines 30A-B. Each of the example bottoming cycles 74, 76 includes features and operations that are the same as or similar to the bottoming cycle 54 explained in reference to the propulsion system 26 shown and described with reference to FIGS. 1 and 2.

Cryogenic liquid fuel flow 48 is routed serially through fuel/working fluid heat exchangers of each of the bottoming cycles 74, 76 before being directed to a corresponding turbine engine 30A-B. The cryogenic fuel flow 48 is utilized for cooling of the working fluid in both bottoming cycles 74, 76 by first cooling working fluid in the first bottoming cycle 74 followed by cooling of the working fluid flow in the second bottoming cycle 76.

A first bypass passage 78 provides for routing of the fuel flow 48 around the first bottoming cycle 74. A second bypass passage 82 provides for routing the fuel flow 48 around the second bottoming cycle 76. The ability to bypass fuel flow 48 around either of the bottoming cycles 74, 76 enables operation of the bottoming cycles 74, 76 to be varied based the amount of thermal energy available during propulsion system operation. Moreover, the ability to bypass one of the bottoming cycles 74, 76 provides for adaptation should one of the bottoming cycles 74, 76 become inoperable.

A valve system 96 is operable to control fuel flow 48 through each of the first bypass passage 78 and the second bypass passage 82. A controller 106 is provided and programmed to operate the valve system 96 to control fuel flow 48 to and around each of the bottoming cycles 74, 76. The controller 106 is programmed to operate the valve system 96 based on engine operating information and/or general aircraft operating information 102. The controller 106 may also utilize information from a sensor system 102 that provides information indicative of current operation of each of the bottoming cycles 74, 76.

The first bypass passage 78 and the second bypass passage 82 provide for tailoring operation to address variations in operation of either of the bottoming cycles 74, 76. Additionally, routing of the fuel flow around one of the bottoming cycles 74, provides for the ability to tailor operation to current operating conditions. For example, in some operating conditions, thermal energy in the working fluid may be such that the cryogenic fuel may cause freezing. Routing of the fuel flow around one or both of the bottoming cycles 74, 76 may be utilized to prevent freezing when limited heat is available, such as for example during initial start-up operation. Moreover, other operating conditions may benefit from the ability to preferentially route the fuel flow to tailor operation of the bottoming cycle. For example, in response to a failure of one of the bottoming cycles 74, 76, the valve system 96 may route fuel flow 48 to maintain operation of the other bottoming cycle and heating of fuel.

Figure 5:
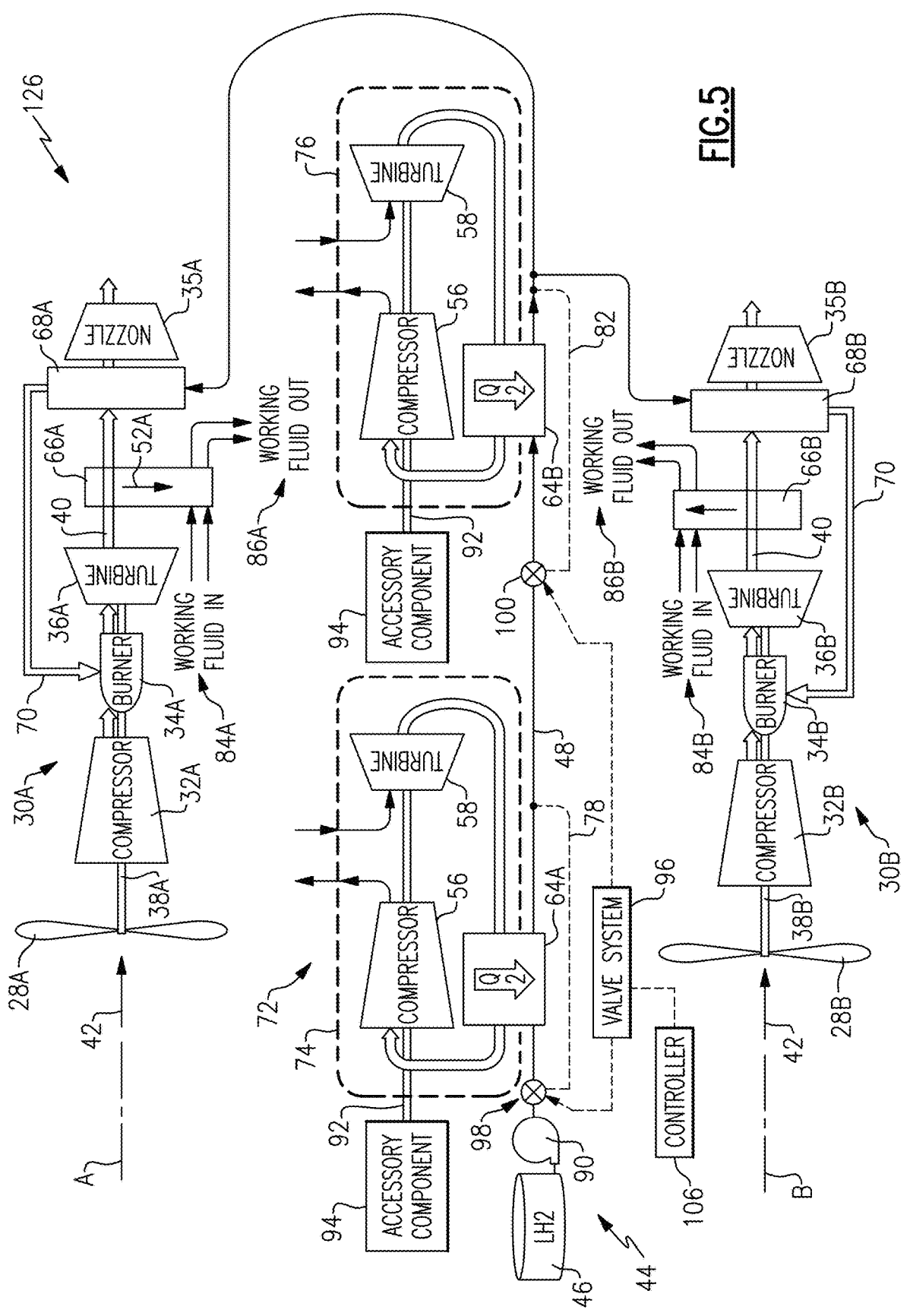
FIG. 5 is a detailed schematic view of the example aircraft propulsion system shown in FIG. 4.

Referring to FIG. 5, with continued reference to FIG. 4, each of the example bottoming cycles 74, 76 is configured to accept thermal energy independently from each of the gas turbine engines 30A-30B. A working fluid flow for each bottoming cycle 74, 76 is heated by the exhaust gas flow 40 in the corresponding primary heat exchanger 66A-B.

The cool working fluid flow 84A-B is schematically shown in communication with the primary heat exchanger 66A-B of each turbine engine 30A-B. A heated working fluid flow 86A-B is schematically shown exiting each of the primary heat exchangers 66A-B. The bottoming cycles 74, 76 are arranged to receive the cooling fuel flow in series. The fuel flow 48 is routed first through the fuel/working fluid heat exchanger 64A of the first bottoming cycle 74 where a first amount of thermal energy is accepted. The fuel flow exhausted from the working fluid heat exchanger 64A of the first bottoming cycle 74 is than routed to the fuel/working fluid heat exchanger 64B of the second bottoming cycle 76. A second amount of thermal energy is accepted into the fuel flow in the second fuel/working fluid heat exchanger 64B.

In one example embodiment, the valve system 96 includes a first valve 98 for controlling flow through the first bypass passage 78 and a second valve 100 for controlling fuel flow through the second bypass passage 82. The controller 106 is programmed to operate the valve system 96 to direct fuel flow through the bypass passages 78, 82 to tailor operation and cooling provided by the fuel flow 48 to operation of the engines 30A-B and the bottoming cycles 74, 76.

The example controller 106 is a device and system for performing necessary computing or calculation operations of the valve system 96. The controller 106 may be specially constructed for operation of the valve system 96, or it may comprise at least a general-purpose computer selectively activated or reconfigured by software instructions stored in a memory device. The controller 106 may further be part of full authority digital engine control (FADEC) or an electronic engine controller (EEC).

Bypassing of fuel flow around one of the bottoming cycles 74, 76 may be performed based on information provided by the sensor system 102 that is indicative of an engine or aircraft operating condition. Accordingly, the sensor system 102 may provide information indicative of a temperature, pressure, ambient conditions, engine speed, aircraft speed, engine power along with any other parameter that provides an indication of a condition of the propulsion system.

The working fluid flow 86A-B may be routed to each of the engines 30A-B directly through flow circuits provided for that purpose. A combination of the working fluid flow 86A-B and a thermal bus fluid 112 as explained with reference to FIG. 3, may also be utilized to communicate thermal energy between the bottoming cycle system 72 and the turbine engines 30A-B.

Although heat from the exhaust gas flow 40 is disclosed by way of specific example, thermal energy from other heat sources (e.g., avionics, fuel cell, lubrication system, bleed air system, environmental control systems, etc.) corresponding to each of the gas turbine engines 30A-B may also be recovered within the bottoming cycles 74, 76.

In one example embodiment, the bottoming cycles 74, 76 are arranged with similar features and capabilities. However, it is within the contemplation of this disclosure that the bottoming cycles 74, 76 may be configured differently with different capabilities for heat absorption and power generation. Such features may include different volumes of working fluid, different working fluid with different heat absorption properties and/or different secondary heat input from different engine or aircraft systems. Moreover, each of the bottoming cycles 74, 76 may have differently configured heat exchangers, bottoming compressors, and/or bottoming turbines. Other differences between the bottoming cycles 74, 76 may also be utilized to provide for tailoring of heat recovery based on the current engine operating conditions and are within the contemplation and scope of this disclosure.

The example bottoming cycle system 72 provides for heating of cryogenic fuel that is flowed through each of the bottoming cycles 74, 76 in a series configuration. However, other routing configurations may be utilized within the scope of contemplation of this disclosure.

Accordingly, the example propulsion systems include bottoming cycles that leverage the cold sink available by the cryogenic fuels and tailor operation to optimize bottoming cycle efficiency.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. An aircraft propulsion system comprising:

at least two gas turbine engines that each include a compressor that pressurizes an inlet flow that is mixed with a cryogenic fuel and ignited in a combustor to generate an exhaust gas flow that is expanded through a turbine to generate shaft power and a propulsive fan driven by the turbine;

a bottoming cycle system where a working fluid is circulated within a closed circuit comprising a bottoming compressor section and a bottoming turbine section, wherein the working fluid is compressed in the bottoming compressor section and expanded through the bottoming turbine section to generate shaft power, wherein each of the at least two gas turbine engines includes a primary heat exchanger for communicating thermal energy into the working fluid of the bottoming cycle system; and a fuel system comprising a cryogenic fuel storage tank and a fuel flow path for routing the cryogenic fuel to each of the at least two gas turbine engines, wherein a fuel/working fluid heat exchanger provides thermal communication between the cryogenic fuel and the working fluid to cool a flow of the working fluid from the bottoming turbine section to the bottoming compressor section, wherein the bottoming cycle system comprises at least two bottoming cycles that each comprise a separate closed circuit for separate flows of the working fluid, and a separate fuel/working fluid heat exchanger in which the cryogenic fuel is placed in thermal communication with a corresponding one of the separate flows of the working fluid of each of the at least two bottoming cycles.

2. The aircraft propulsion system as recited in claim 1, wherein the closed circuit for the working fluid of the bottoming cycle system comprises separate portions for communicating a flow of the working fluid to the primary heat exchanger of each of the at least two gas turbine engines.

3. The aircraft propulsion system as recited in claim 1, further comprising a thermal transfer circuit for communicating thermal energy from each of the at least two gas turbine engines into the working fluid of the bottoming cycle system.

4. The aircraft propulsion system as recited in claim 1, wherein the bottoming cycle system is disposed within a fuselage of an aircraft.

5. The aircraft propulsion system as recited in claim 1, wherein thermal energy from each of the at least two gas turbine engines is communicated separately to each of the at least two bottoming cycles.

6. The aircraft propulsion system as recited in claim 1, wherein the cryogenic fuel is separately heated by each of the at least two bottoming cycles.

7. The aircraft propulsion system as recited in claim 6, further comprising a valve system for controlling a flow of the cryogenic fuel to each of the at least two bottoming cycles, wherein the valve system is configured to bypass fuel flow separately around each of the at least two bottoming cycles such that the cryogenic fuel is heated by less than all of the at least two bottoming cycles.

8. The aircraft propulsion system as recited in claim 7, including a controller programed to operate the valve system to route the cryogenic fuel around one of the at least two bottoming cycles in response to a predefined operating condition.

9. The aircraft propulsion system as recited in claim 1, wherein a flow of the cryogenic fuel proceeds in series through the at least two bottoming cycles.

10. The aircraft propulsion system as recited in claim 1, wherein one of the at least two bottoming cycles comprises a different maximum capacity for transferring thermal energy than others of the at least two bottoming cycles.

11. An aircraft propulsion system comprising:

at least two gas turbine engines that each include a compressor that pressurizes an inlet flow that is mixed with a cryogenic fuel and ignited in a combustor to generate an exhaust gas flow that is expanded through a turbine to generate shaft power and a propulsive fan driven by the turbine;

a bottoming cycle system including at least two bottoming cycles that each include a working fluid circulated within a closed circuit comprising a bottoming compressor section and a bottoming turbine section, wherein the working fluid is compressed in the bottoming compressor section and expanded through the bottoming turbine section to generate shaft power, wherein each of the at least two gas turbine engines includes a primary heat exchanger for communicating thermal energy into the working fluid of the bottoming cycle system;

a fuel system comprising a cryogenic fuel storage tank and a fuel flow path for routing the cryogenic fuel to the combustor of each of the at least two gas turbine engines through each of the at least two bottoming cycles in series, wherein each of the at least two bottoming cycles includes a fuel/working fluid heat exchanger that provides thermal communication between the cryogenic fuel and the working fluid within a corresponding one of the at least two bottoming cycles.

12. The aircraft propulsion system as recited in claim 11, wherein thermal energy from each of the at least two gas turbine engines is communicated separately to each of the at least two bottoming cycles.

13. The aircraft propulsion system as recited in claim 11, further comprising a valve system for controlling a flow of the cryogenic fuel to each of the at least two bottoming cycles, wherein the valve system is configured to bypass fuel flow separately e around each of the at least two bottoming cycles such that the cryogenic fuel is heated by less than all of the at least two bottoming cycles.

14. The aircraft propulsion system as recited in claim 13, including a controller programed to operate the valve system to route the cryogenic fuel around one of the at least two bottoming cycles in response to a predefined operating condition.

15. The aircraft propulsion system as recited in claim 11, wherein one of the at least two bottoming cycles comprises a different maximum capacity for transferring thermal energy than others of the at least two bottoming cycles.

16. The aircraft propulsion system as recited in claim 11, further comprising a thermal transfer circuit for communicating thermal energy from each of the at least two gas turbine engines into the working fluid of the bottoming cycle system.

17. A method of configuring an aircraft propulsion system comprising:

configuring at least two gas turbine engines to generate an exhaust gas flow;

configuring a bottoming cycle system including at least two bottoming cycles that each include a working fluid circulated within a closed circuit comprising a bottoming compressor section and a bottoming turbine section, wherein each of the at least two gas turbine engines includes a primary heat exchanger for communicating thermal energy into the working fluid of the bottoming cycle system; and configuring a cryogenic fuel system comprising a cryogenic fuel storage tank and a fuel flow path for routing the cryogenic fuel to a combustor of each of the at least two gas turbine engines through each of the at least two bottoming cycles in series, wherein each of the at least two bottoming cycles includes a fuel/working fluid heat exchanger that provides thermal communication between the cryogenic fuel and the working fluid within a corresponding one of the at least two bottoming cycles.

18. The method as recited in claim 17, further comprising configuring a valve system for controlling a flow of the cryogenic fuel through a bypass passage around one of the at least two bottoming cycles.

19. The method as recited in claim 18, further comprising assembling the bottoming cycle system such that at least one of the at least two bottoming cycles comprises a different maximum capacity for transferring thermal energy than others of the at least two bottoming cycles.

* * * * *